Sept. 20, 1966 J. P. PEARCE 3,273,274
SELECTIVELY ILLUMINATED INDICATING DEVICES
Filed June 3, 1964 3 Sheets-Sheet 1

Inventor:
John Philip Pearce
by Rines and Rines
Attorneys

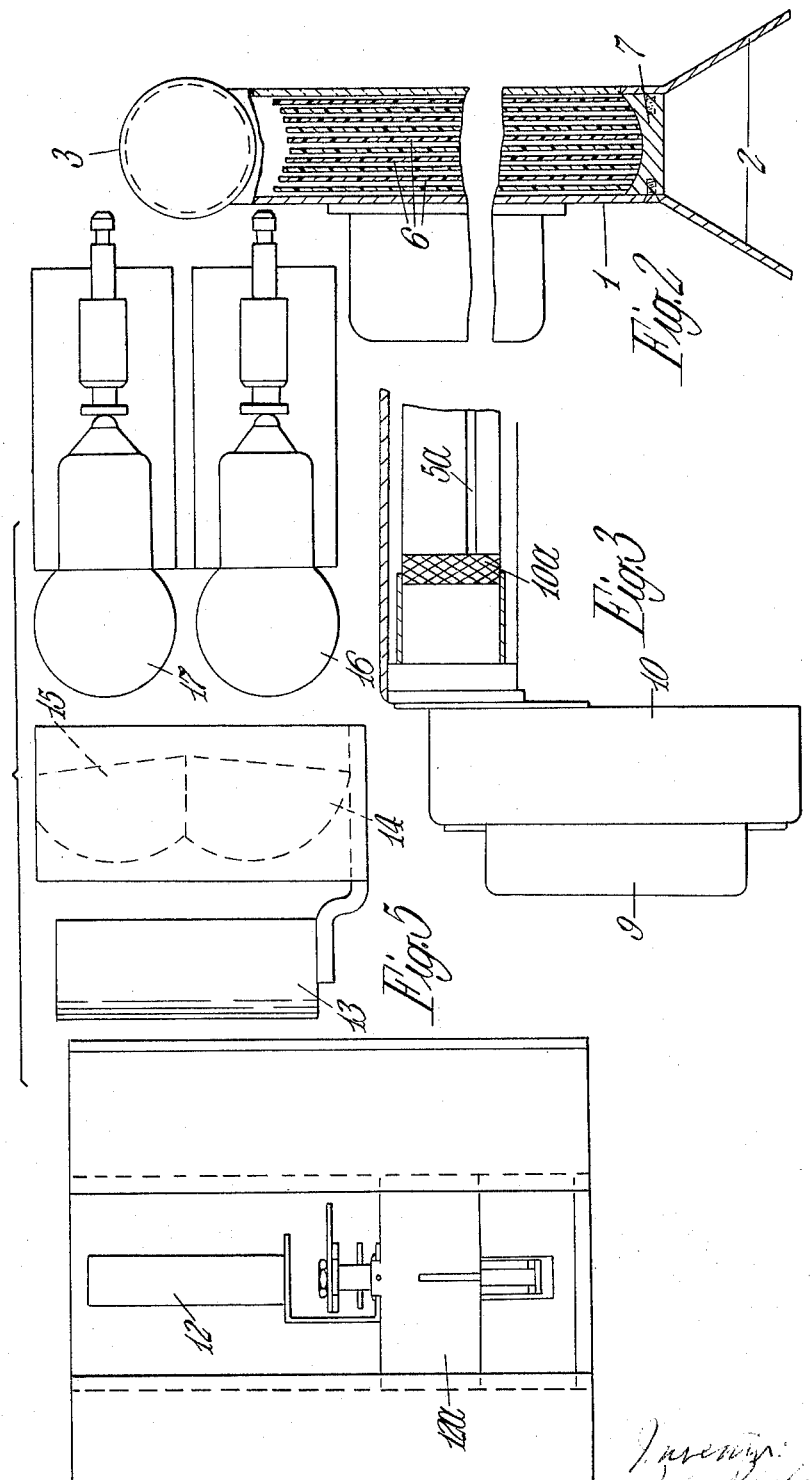

Sept. 20, 1966   J. P. PEARCE   3,273,274
SELECTIVELY ILLUMINATED INDICATING DEVICES
Filed June 3, 1964   3 Sheets-Sheet 3
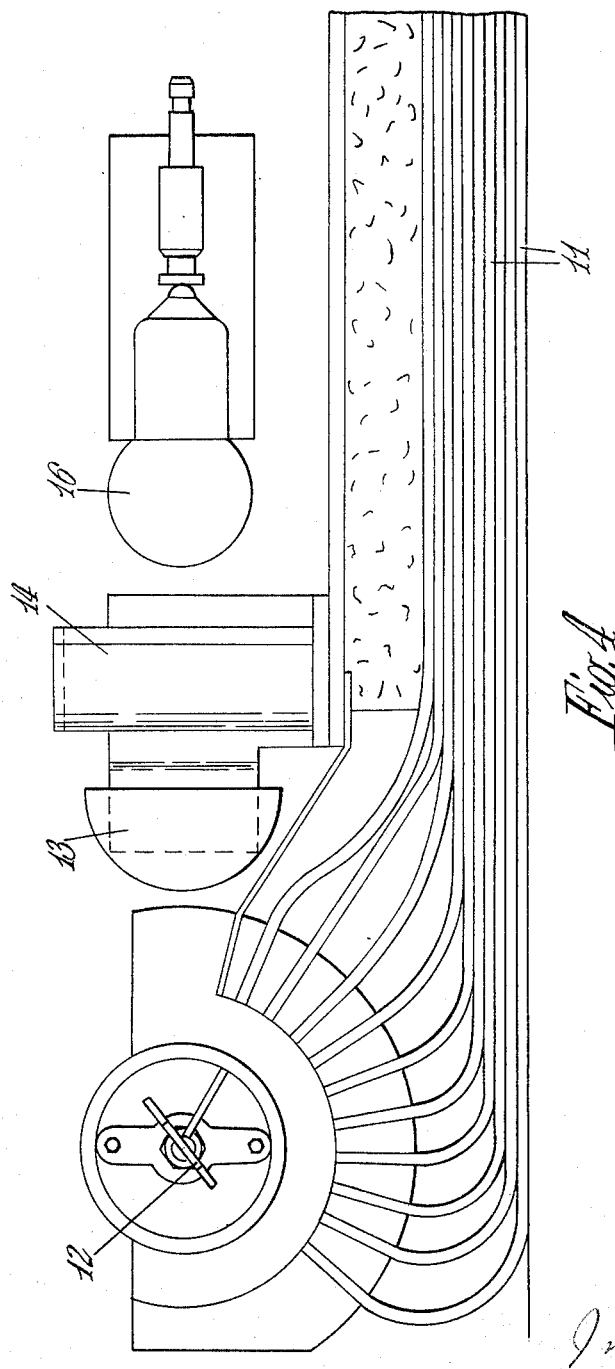

United States Patent Office 3,273,274
Patented Sept. 20, 1966

3,273,274
SELECTIVELY ILLUMINATED INDICATING
DEVICES
John Philip Pearce, Hillingdon, Middlesex, England, assignor to K.G.M. Electronics Limited, Richmond, Surrey, England
Filed June 3, 1964, Ser. No. 372,171
2 Claims. (Cl. 40—130)

This invention relates to selectively illuminated indicating devices employing two or more light transmitting plates and through one or other of which selective light is "piped" to illuminate indicia on each respective plate. The term "plate" includes sheet, strip or the like.

Hitherto the selective illumination has been effected by independent light sources.

Generally the plates are disposed one behind the other in stacked relation.

Conveniently the selective illumination is effected by means of a moving shutter interposed between the light source or sources and the edges to be selectively illuminated.

Alternatively by means of a moving mirror reflecting the light from the source or sources on to the ledges to be selectively illuminated.

The invention will be further described with reference to the accompanying drawings.

FIGURE 2 is an end elevation in partial section;

FIGURE 3 is a detail of the drive mechanism in partial section;

FIGURE 4 is a plan of a further embodiment; and

FIGURE 5 is a side elevation of part of FIGURE 4.

Figure 1:
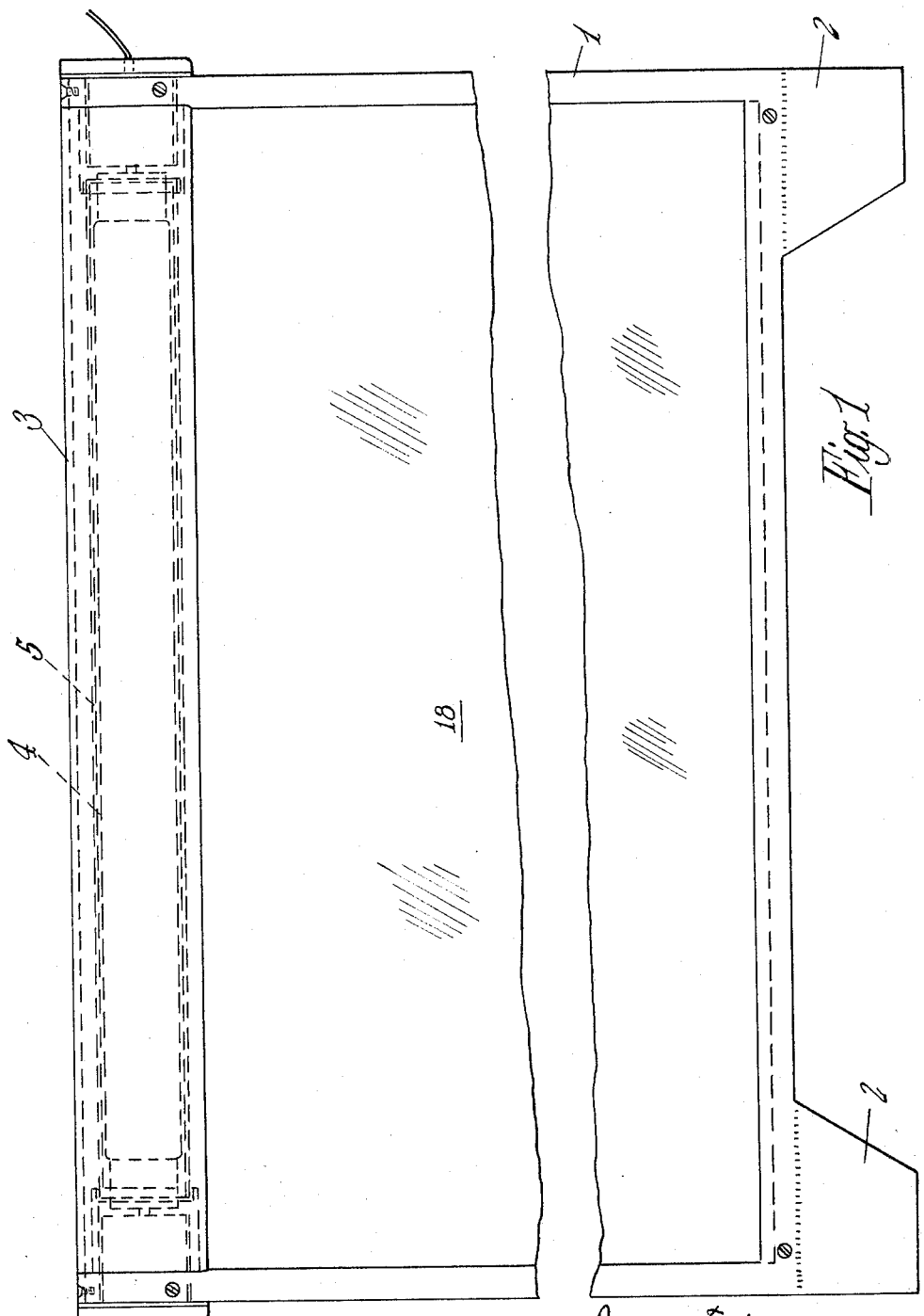
FIGURE 1 is a side elevation of an embodiment of the invention.

In the drawings of FIGURES 1 to 3 a flat case 1 is supported along its longer narrow side by means of feet 2 and is formed at the top with a cylindrical part 3 to contain a strip lamp 4 surrounded by a rotatable slotted cylindrical shutter 5.

Within the case are stacked a plurality of transparent sheets 6 supported at the bottom on concave arcuate plates 7 so as to lie with their top edges on a curve concentric with the lamp axis.

On one side of the casing is a transparent window 18 for viewing.

The shutter 5 is rotated by means of an electric motor 9 through a reduction gear 10 and frictional gear drive 10a.

In operation the sheets are marked with various symbols, and are illuminated along the edge in turn by the light emerging from the slot 5a in the shutter 5 so as to present a sequence of visual images to the viewer.

In FIGURES 4 and 5 of the drawings are shown a plurality of transparent plates 11 in contact with one another over an area.

One set of ends of the sheets are bent round to lie in spaced positions on an arc of a cylinder, the ends being at right angles to the arc.

As shown, the spacing between ends is twice the plate thickness. Arranged to rotate about the central axis of the cylinder, on an arc of which the ends are disposed, is a mirror 12 which may, for example, form part of the movement of a meter 12a.

The mirror 12 is illuminated through a condensing system of half cylindrical components comprising one component 13 parallel to the mirror and two components 14, 15 at right angles thereto.

Each of the components 14, 15 is illuminated by a filament lamp respectively 16, 17 which may be a main and stand-by lamp respectively.

In operation, light emanating from one or both of the filament lamps 16, 17 are condensed by the half cylindrical component 13. Component 13 further focuses the light onto mirror 12 which reflects a strip of light, say 1½ times the width of plates 11 and is projected along the full length of the edges of the plates. As the mirror 12 is rotated, each plate will be illuminated in turn. The plates 11 are of such composition that the light reflects between the parallel faces of the plate thereby illuminating the entire plate, and indicia and escaping only at the edges.

The plate spacing and image width chosen allow some tolerance on the mirror position.

Various modifications may be made within the scope of the invention.

I claim:

1. A selectively illuminated indicating device comprising a light source, at least two light transmitting plates with indicia on their faces and disposed in stacked relation, and an independently moveable mirror which reflects the light from the source onto the edge of the desired plate to illuminate the entire plate and make its indicia visible.

2. A selectively illuminated indicating device as claimed in claim 1, and further including focusing means between said light source and said mirror and a secondary stand-by light source immediately adjacent said first mentioned light source.

References Cited by the Examiner
UNITED STATES PATENTS

| 2,480,178 | 8/1949 | Zinberg | 240—1 |
| 2,722,762 | 11/1955 | Krajian | 40—130 |
| 3,114,283 | 12/1963 | Gruner | 240—1 |
| 3,138,663 | 6/1964 | McNaney. | |
| 3,144,807 | 8/1964 | Coomes | 88—24 |
| 3,167,612 | 1/1965 | Strickholm | 88—1 |

FOREIGN PATENTS 291,067   9/1953   Switzerland.

EUGENE R. CAPOZIO, Primary Examiner.

EVON C. BLUNK, Examiner.

N. ANSHER, Assistant Examiner.